United States Patent [19]
Ellis

[11] 3,895,649
[45] July 22, 1975

[54] ELECTRIC HOSECOCK
[75] Inventor: Samuel B. Ellis, Lindenhurst, N.Y.
[73] Assignee: Delta Scientific Corporation, Lindenhurst, N.Y.
[22] Filed: June 19, 1974
[21] Appl. No.: 480,959

[52] U.S. Cl. .................... 137/595; 251/9; 251/337; 267/155
[51] Int. Cl. .............................................. F16k 7/06
[58] Field of Search .................. 251/7, 9, 10, 337; 267/155; 137/595

[56] References Cited
UNITED STATES PATENTS

| | | | |
|---|---|---|---|
| 1,346,948 | 7/1920 | Freedman | 251/9 X |
| 2,293,956 | 8/1942 | Walthers | 251/337 X |
| 2,471,623 | 5/1949 | Hubbell | 251/7 X |
| 2,767,735 | 10/1956 | Darling | 267/155 X |
| 2,895,653 | 7/1959 | Giepen | 251/9 X |
| 3,054,425 | 9/1962 | Pribonic | 251/9 X |
| 3,279,656 | 10/1966 | Axtell et al. | 251/9 X |
| 3,575,161 | 4/1971 | London | 251/9 X |

Primary Examiner—Martin P. Schwadron
Assistant Examiner—Richard Gerard
Attorney, Agent, or Firm—Pennie & Edmonds

[57] ABSTRACT

A hosecock for constricting the flow of fluid in a flexible tube is disclosed. The hosecock comprises a body which includes at least one jaw. The jaw is disposed adjacent the tubes whose flow is to be controlled by the hosecock. A plug is rotatably mounted in the body of the hosecock and a coil spring is disposed around and secured to the plug. The end section of the spring is straight and forms an arm which, along with one of the facing jaws, defines a channel for receiving the flexible tube. The plug is set in a desired angular position so as to urge the arm of the spring toward or away from the tube, thereby closing or opening the tube. The arm of the spring is adapted to be engaged by an electromagnetic operator, such as a solenoid. When the operation is activated, the arm is moved in relation to the tube, thereby controlling the fluid flow through the tube. In the preferred embodiment, the arm extends between a pair of tubes which are disposed between a pair of facing jaws and alternately constricts the fluid flow through one of them.

6 Claims, 4 Drawing Figures

PATENTED JUL 22 1975

3,895,649

ELECTRIC HOSECOCK

BACKGROUND OF THE INVENTION

A number of industrial processes require the contaminant-free valving of conduits carrying fluids. Prior art solutions to this problem involved the use of such devices as screw or pinch clamps of various types for constricting the flow of liquid through flexible tubing. However, with the increasing utilization of electronic control systems for automated control of fluidic systems, there developed a significant need for a contaminant-free valve which could be actuated electrically.

Typical prior art solutions to this problem involved the use of a spring-biased pivoted rocker arm which bears down on a flexible tube, thereby stopping the fluid flow through the tube. One end of the rocker arm is pulled by the spring, thereby urging the opposite end of the arm toward the tube and constricting the flow of liquid through the tube. A solenoid is mechanically coupled to the rocker arm to control its action. When it is desired to allow liquid to pass through the tube, the solenoid is electrically actuated. The end of the rocker arm, which was urged toward the tube is then pulled away from the tube, thus allowing the fluid to flow through the tube. If desired, the rocker arm may be made to alternatively constrict the fluid flow in one of two tubes while allowing the fluid to flow in the other of the tubes. See, for example, U.S. Pat. No. 3,575,161.

One of the problems with such prior art devices is the possibility that the spring may not exert the proper amount of force through the rocker arm onto the tube to be valved. Some prior art valves do not suffer from this problem. These valves include a spring which biases the rocker arm by being put in tension or compression and which is adjustably mounted, thus allowing the amount of tension or compression to be varied. See U.S. Pat. No. 2,895,653.

However, even these prior art valves tend to suffer from a number of inadequacies. If it is desired to make a spring adjustable, the fact that the springs are always put in tension or compression results in adjusting mechanisms for the springs which are complicated and unsatisfactory. Another problem is the proliferation of parts in these prior art valves. A properly operating system requires a rocker arm, a pivot support for the rocker arm, a spring, and a counter point support for the spring. Still another problem with these prior art electrically activated hosecock valves is their large size which is necessitated by their basic structural configuration.

SUMMARY OF THE INVENTION

In accordance with the present invention, a new contaminant-free electrically actuated hosecock valve which is far superior to prior art valves is provided. The valve is very small and requires a minimum number of parts.

The valve comprises at least one jaw having a tube for carrying a fluid disposed adjacent to it. The jaw is machined into the body of the valve. The body of the valve also includes a bore for supporting a plug to which a spring having an arm is secured and around which the spring is disposed, thus allowing the spring to be put in torsion. In the preferred embodiment, a pair of tubes is disposed between a pair of facing jaws. The arm of the spring is disposed between the tubes and is torsionally biased toward the first of the tubes. The arm is resiliently movable between the jaws. The position of the plug may be angularly varied, thereby varying the amount of force with which the arm of the spring is urged against one of the tubes. During operation, a solenoid which is mechanically coupled to the arm of the spring is used to urge the spring from a position in which it closes the first tube by compressing it while leaving the second tube unobstructed, to a position where the second tube is closed by compression while the first is unobstructed.

DETAILED DESCRIPTION OF THE PREFERRED EMBODIMENT

Figure 1:
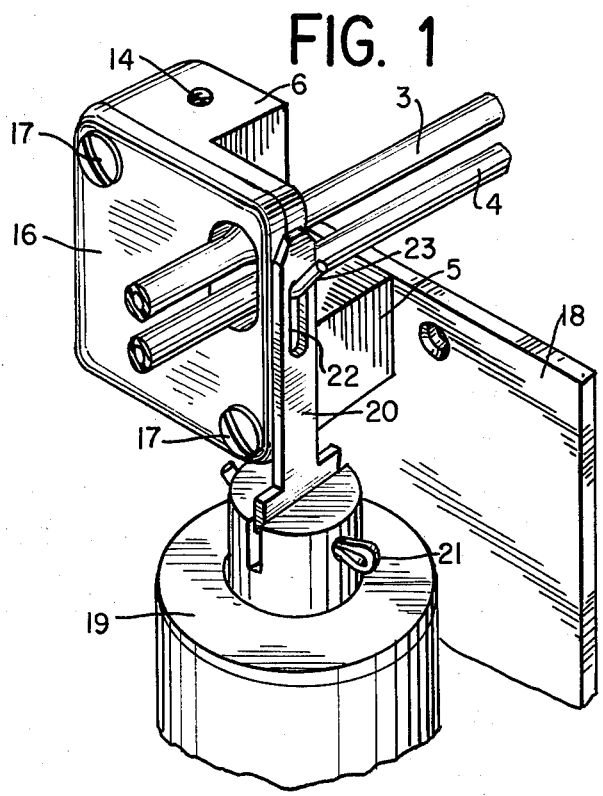
FIG. 1 is a perspective view of an electrically actuated hosecock constructed in accordance with the present invention in conjunction with an electromechanical operator for actuating it.
Figure 4:
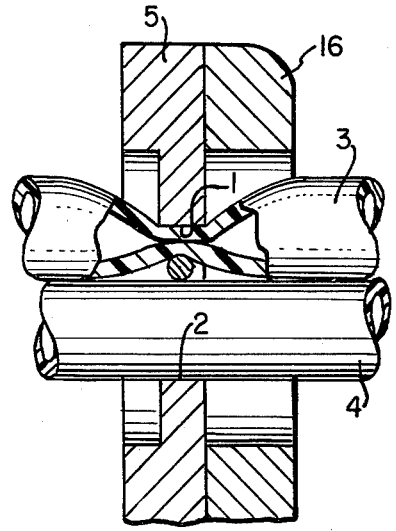
FIG. 4 is a cross-sectional view of the hosecock along lines 4—4 of FIG. 2.
Figure 2:
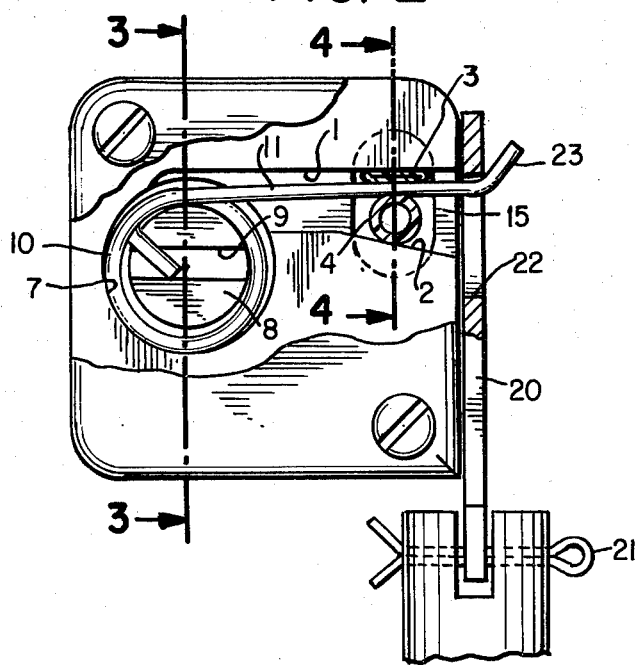
FIG. 2 is a plan view of the hosecock illustrated in FIG. 1.
Figure 3:
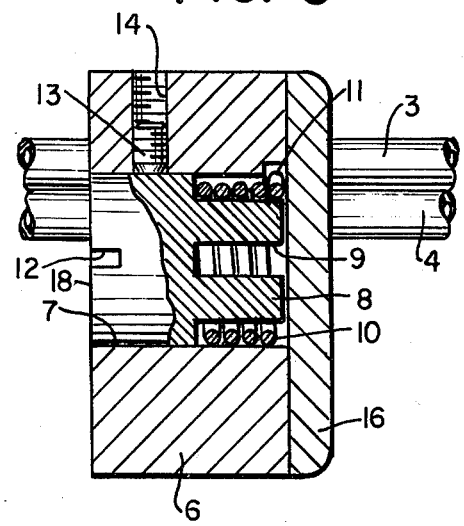
FIG. 3 is a cross-sectional view of the hosecock along lines 3—3 of FIG. 2.

As shown in FIGS. 1 and 2, the valve includes a pair of facing jaws 1 and 2. A normally closed tube 3 and a normally open tube 4 are disposed between jaws 1 and 2. Jaws 1 and 2 are machined into the valve body 5, as is most clearly illustrated in FIGS. 3 and 4. The width of the jaws is made relatively narrow in order to make it easy to insert the tubes between the jaws. A projection 6 of the valve body 5 is provided with a bore 7 in which a plug 8 is mounted. Plug 8 is machined to include a support indentation 9. A spring 10 is disposed around plug 8 and secured at its end in support indentation 9. Spring 10 includes an arm 11 which may be adjustably biased to close tube 3 by rotating plug 8, thereby putting spring 10 in torsion. Plug 8 may be most easily rotated by inserting a screwdriver into groove 12 and setting it in the desired position. Setscrew 13, which is mounted in a bore 14 in projection 6, may then be tightened to secure plug 8 in the desired position.

During operation, arm 11 of spring 10 moves up and down in a channel 15, alternately closing tubes 3 and 4 by pinching them between arm 11 and jaws 1 and 2 respectively. It has been found that the use of an arm with a circular cross section provides mose effective sealing of the tube. In the non-actuated position, plug 8 is adjusted to put spring 10 in torsion with its arm 11 bearing against tube 3 and jaw 1, thereby closing tube 3. A plate 16 is secured to body 5 by screws 17. Plate 16 and body 5 together prevent transverse movement of arm 11.

A valve constructed in accordance with the present invention could be mounted on any support surface 18. A solenoid 19 or any other suitable electromechanical operator could also be secured to support surface 18 in order to operate it. The solenoid would be linked to the arm 11 of the spring by a linkage 20 and a cotter pin 21. The end of arm 11 would extend through a hole 22 in the linkage 20. Linkage 20 would be prevented from disengaging arm 11 by the bent end 23 of arm 11. When it is desired to open tube 3 and close tube 4, the solenoid would be actuated, resulting in the displacement of linkage 20 against the force of the spring, thereby opening tube 3 and closing tube 4.

While a preferred embodiment of the invention has been described, it is, of course, understood that various changes can be made in the size and shape of the parts without departing from the spirit and scope of the invention as defined by the appended claims.

I claim:

1. A hosecock for controlling the flow of a fluid in a flexible tube, comprising:
   a. a body;
   b. a jaw supported in said body;
   c. arm means for defining a channel for receiving the tube, said arm means being spaced from said jaw and adapted to be displaced by an electromechanical operator, said channel being defined between said jaw and said arm means;
   d. a plug rotatably mounted in said body adjacent said arm means;
   e. spring means for urging said arm means toward said jaw to pinch said tube, said spring means being secured to said arm means and plug and disposed around and secured to said plug and being put in torsion by angular displacement of said plug; and
   f. means for setting said plug in a desired angular position.

2. A hosecock for controlling flow through two flexible tubes by alternately constricting the flow of a fluid through one of the two flexible tubes, comprising:
   a. a body;
   b. a pair of facing jaws supported in said body;
   c. arm means disposed between said jaws for defining a pair of apertures between said arm means and each of said jaws for receiving the two flexible tubes, said arm means adapted to be displaced by an electromechanical operator;
   d. a plug rotatably mounted in said body adjacent said arm means;
   e. spring means for urging said arm means toward one of said facing jaws secured to said arm means and disposed around and secured to said plug, said spring means being put in torsion by rotation of said plug; and
   f. means for securing said plug in a desired position.

3. A hosecock as in claim 2, wherein said means for securing said plug comprises a setscrew mounted in said body for holding said plug in the desired angular position.

4. A hosecock as in claim 3, wherein said spring means and said arm means are a single element.

5. A hosecock as in claim 4, wherein the end of said arm is bent to insure positive engagement for said electromechanical operator.

6. A hosecock as in claim 5, wherein said plug includes a groove for facilitating the adjustment of the angular position of the plug.

\* \* \* \* \*